(12) United States Patent
Buckley et al.

(10) Patent No.: US 9,356,785 B2
(45) Date of Patent: May 31, 2016

(54) METHOD AND SYSTEM FOR SECURITY ENHANCEMENT FOR MOBILE COMMUNICATIONS

(71) Applicant: BlackBerry Limited, Waterloo (CA)

(72) Inventors: Michael Eoin Buckley, Grayslake, IL (US); Eswar Kalyan Vutukuri, Hedge End (GB)

(73) Assignee: BlackBerry Limited, Waterloo, Ontario (CA)

( * ) Notice: Subject to any disclaimer, the term of this patent is extended or adjusted under 35 U.S.C. 154(b) by 289 days.

(21) Appl. No.: 13/968,059

(22) Filed: Aug. 15, 2013

(65) Prior Publication Data

US 2013/0336483 A1    Dec. 19, 2013

Related U.S. Application Data

(63) Continuation of application No. PCT/US2011/024893, filed on Feb. 15, 2011.

(51) Int. Cl.
*H04K 1/00* (2006.01)
*H04L 9/28* (2006.01)
*H04W 12/00* (2009.01)
(Continued)

(52) U.S. Cl.
CPC ............. *H04L 9/28* (2013.01); *H04L 63/0457* (2013.01); *H04W 12/00* (2013.01); *H04L 1/0056* (2013.01); *H04L 1/0059* (2013.01); *H04L 1/0071* (2013.01); *H04W 4/00* (2013.01); *H04W 52/00* (2013.01); *H04W 52/32* (2013.01); *H04W 80/02* (2013.01)

(58) Field of Classification Search
CPC ...... H04L 9/28; H04L 63/0457; H04L 1/0056; H04L 1/0059; H04L 1/0071; H04W 12/00; H04W 52/00; H04W 52/32; H04W 4/00
USPC .................................. 380/255; 370/340, 341
See application file for complete search history.

(56) References Cited

U.S. PATENT DOCUMENTS 3,775,746 A * 11/1973 Boudreau et al. ............. 714/761
5,923,761 A *  7/1999 Lodenius ........................ 455/73
(Continued)

FOREIGN PATENT DOCUMENTS

EP         2099241         9/2009

OTHER PUBLICATIONS

Radio access protocol of the new GSM land mobile communication standard, W Fuhrmann, A Eizenhofer; Vehicular Technology Conference, 1988.*

(Continued)

*Primary Examiner* — Jayesh Jhaveri
(74) *Attorney, Agent, or Firm* — Fish & Richardson P.C.

(57) ABSTRACT

A method and system for enhanced security for A5/1 encoding, the method including choosing, at a transmitter, bits within a layer 1 header of a slow associated control channel ('SACCH') message for randomization; and setting, at the transmitter, the chosen bits randomly prior to channel coding and encryption of the slow associated control channel message. Further the method may include choosing, at a transmitter, a number of bits to toggle after convolution coding of a message containing a slow associated control channel message, the number of toggled bits being sufficiently low to allow correction at a receiver; and toggling, at the transmitter, said bits based on the channel conditions of the message.

16 Claims, 7 Drawing Sheets

(51) Int. Cl.
*H04L 29/06* (2006.01)
*H04W 52/00* (2009.01)
*H04L 1/00* (2006.01)
*H04W 52/32* (2009.01)
*H04W 4/00* (2009.01)
*H04W 80/02* (2009.01)

(56) References Cited

U.S. PATENT DOCUMENTS

| | | | | |
|---|---|---|---|---|
| 6,795,425 | B1* | 9/2004 | Raith | 370/345 |
| 7,730,385 | B2* | 6/2010 | Smolinske | H03M 13/3746 714/780 |
| 8,107,542 | B1* | 1/2012 | Lou | H04L 1/0054 375/259 |
| 8,879,732 | B2* | 11/2014 | Jokinen | H04L 63/0457 380/247 |
| 2004/0120302 | A1* | 6/2004 | Sebire | H04B 7/2659 370/347 |
| 2005/0003831 | A1* | 1/2005 | Anderson | 455/456.1 |
| 2007/0140164 | A1* | 6/2007 | Zeng | H04L 1/0054 370/329 |
| 2007/0147621 | A1* | 6/2007 | Barkan et al. | 380/286 |
| 2009/0323588 | A1* | 12/2009 | Aghili et al. | 370/328 |
| 2010/0067440 | A1* | 3/2010 | Dick et al. | 370/328 |
| 2010/0189201 | A1* | 7/2010 | Heiman | 375/341 |
| 2012/0155356 | A1* | 6/2012 | Lei et al. | 370/311 |
| 2012/0213373 | A1* | 8/2012 | Xin et al. | 380/287 |
| 2013/0058485 | A1* | 3/2013 | Xin | H04L 9/0668 380/270 |

OTHER PUBLICATIONS

International Search Report and Written Opinion, issued by the International Searching Authority in connection with International patent application No. PCT/US2011/024893, on Mar. 5, 2012, 15 pages.

NOHL, "Attacking phone privacy,"BlackHat 2010 Lecture Notes, 2010, Security Research Labs, Berlin, 6 pages.

Canadian Intellectual Property Office, Office Action, Application No. 2821339, Feb. 5, 2015.

* cited by examiner

METHOD AND SYSTEM FOR SECURITY ENHANCEMENT FOR MOBILE COMMUNICATIONS

RELATED APPLICATIONS

The present application is a bypass continuation of PCT application PCT/US2011/024893, filed Feb. 15, 2011, the entire contents of which are incorporated herein by reference.

FIELD OF THE DISCLOSURE

The present disclosure relates to security for mobile communications and in particular relates to A5/1 encryption for the global system for mobile communications (GSM).

BACKGROUND

GSM supports a number of different encryption techniques to cipher the data at layer 1 on the radio interface. These encryption techniques are known as A5/1, A5/3 and A5/4, in accordance with the Third Generation Partnership Project (3GPP), "*Technical Specification Group Services and System Aspects; Security Related Network Features*", Technical Specification 43.020 V9.1.0, 2009-12-18, the contents of which are incorporated herein by reference.

A5/1 encryption is the most commonly used encryption technique for GSM, and support for A5/1 is mandatory for all GSM mobile devices since GSM Release-1999. A5/3 and A5/4 are more robust encryption algorithms, which have been specified more recently by 3GPP and are not yet widely supported among mobile devices or networks currently in operation.

Physical layer (Layer 1) security in GSM using the A5/1 cipher is vulnerable to being broken, and the exploitation of the vulnerability has been shown by researchers to be practical through a "known plain text" attack on GSM speech calls utilizing the A5/1 cipher.

A known plain text attack can be performed on an encryption algorithm when blocks of known text and ciphered text are available to an attacker. In case of GSM, during the speech call, signaling over the slow associated control channel (SACCH) is known to be vulnerable to known plain text attacks as the contents of the SACCH during the speech call constitute periodically repetitive and predictable information. In particular, the SACCH periodically transmits information specific to the neighbor cell configuration and the same information is also broadcast on the broadcast control channel (BCCH) of the cell in an unencrypted fashion and can be read by any mobile in the cell (and hence available to the attacker). The information specific to the neighbor cell configuration for a given cell is typically static and therefore typically doesn't change during the call. The system information (SI) messages transmitted over the SACCH carry the neighbor cell configuration information during the call. Ciphering of this "known" text in the system information messages sent on the SACCH renders the contents of the encrypted SACCH open to so-called known plain text attacks to obtain the cipher session key.

BRIEF DESCRIPTION OF THE DRAWINGS

The present disclosure will be better understood with reference to the drawings, in which.

DETAILED DESCRIPTION OF THE DRAWINGS

The present disclosure provides a method comprising: choosing, at a network element, bits within a layer 1 header of a slow associated control channel ('SACCH') message for randomization; and setting, at the network element, said chosen bits randomly prior to channel coding and encryption of said slow associated control channel message.

The present disclosure further provides a network element comprising: a processor; memory; and a communications subsystem, wherein the processor, memory and communications subsystem cooperate to choose, at a network element, bits within a layer 1 header of a slow associated control channel ('SACCH') message for randomization; and set, at the network element, said chosen bits randomly prior to channel coding and encryption of said slow associated control channel message.

The present disclosure further provides a method comprising: choosing, at a network element, a number of bits for toggling after the convolution coding of a message containing a slow associated control channel message, said number of bits being sufficiently low to allow correction at a receiver; and toggling, at the network element, the chosen bits of said message after convolution coding.

The present disclosure further provides a network element comprising: a processor; memory; and a communications subsystem, wherein the processor, memory and communications subsystem cooperate to: choose, at a network element, a number of bits for toggling after the convolution coding of a message containing a slow associated control channel message, said number of bits being sufficiently low to allow correction at a receiver; and toggle, at the network element, the chosen bits of said message after convolution coding.

The present methods and systems can be used as a deterrent for plain text attacks on any message containing blocks that are partly randomizable and partly known, interleaved together to form a message that is encrypted. In one embodiment, the methods and systems relate to the randomization of SACCH control signaling to prevent known plain text attacks on the SACCH control messages.

Figure 1:
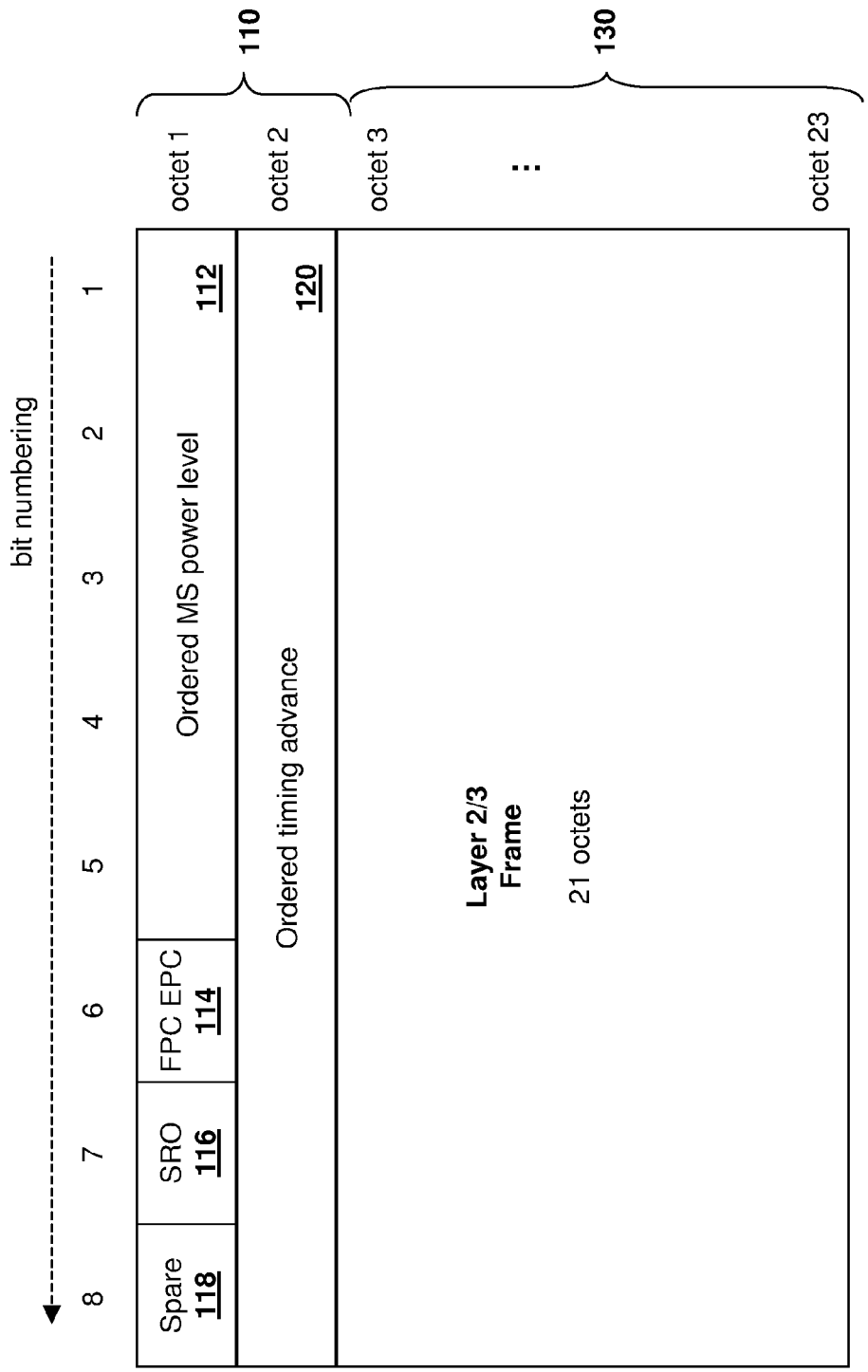
FIG. 1 is a block diagram showing a downlink SACCH message.

Reference is now made to FIG. 1. FIG. 1 shows a block diagram illustrating a downlink SACCH message block.

The downlink SACCH message block comprises 23 bytes, of which the first 2 bytes, referred to herein as sub-block 110, are directed to layer 1 signaling while the remaining 21 bytes, referred to herein as sub-block 130, are directed to layer 2 or layer 3 signalling.

As seen in FIG. 1, the first 5 bits of the first octet (byte) of the layer 1 sub-block 110 comprise an ordered mobile station power level 112. This 5 bit field is used to control the transmit power from the mobile device.

The $6^{th}$ bit of the first octet is the fast power control (FPC) or enhanced power control (EPC) mechanism signaling bit 114. If a mobile device and the network support fast power control or enhanced power control, the FPC EPC signaling bit 114 signals that such power control is in operation. For speech calls, only EPC signaling using the bit is relevant since FPC is defined for circuit switched data and not for speech. When EPC is in operation, EPC FPC signaling bit 114 is set and this directs the mobile device to look to a different channel for power control information instead of following the power control command in the ordered mobile station power level field 112. Thus when EPC is in operation the mobile device ignores the ordered mobile station power level field 112.

The $7^{th}$ bit of the first octet of sub-block 110 is the SACCH repetition order (SRO) bit 116. The SRO bit 116 controls whether or not the SACCH repetition is ordered in the opposite link (i.e. uplink) and is used for repeated SACCH control from release 6 of the GSM standard onwards. Pre-release 6 mobile devices ignore the bit. Release 6 or later mobile devices support repeated SACCH and the mobile devices repeat the uplink SACCH message on the next block if, and only if, the SRO bit 116 is set.

The network may determine that a mobile device supports repeated SACCH by checking the mobile station radio access capability (MSRAC) or the mobile station class mark for an indication of support of any release 6 or later optional features.

The $8^{th}$ bit is a spare bit 118 that currently has no functionality associated with it. Functionality for spare bit 118 may be defined in the future.

The second octet of sub-block 110 comprises the ordered timing advance 120. The ordered timing advance 120 controls the uplink timing of transmission from the mobile device to compensate for potentially time varying propagation delays between the mobile device and the base station.

Sub-block 110 therefore comprises two octets with values that typically vary slowly over time. It should be noted that some parts of the layer 1 header are also transmitted to the mobile during the call set-up phase before the call is encrypted.

Sub-block 130 contains information for high layers, and can include, for example, information specific to neighbor cell configuration. This information is also broadcast unencrypted on the broadcast control channel (BCCH) and is available for any mobile in the cell to read off the air.

Figure 2:
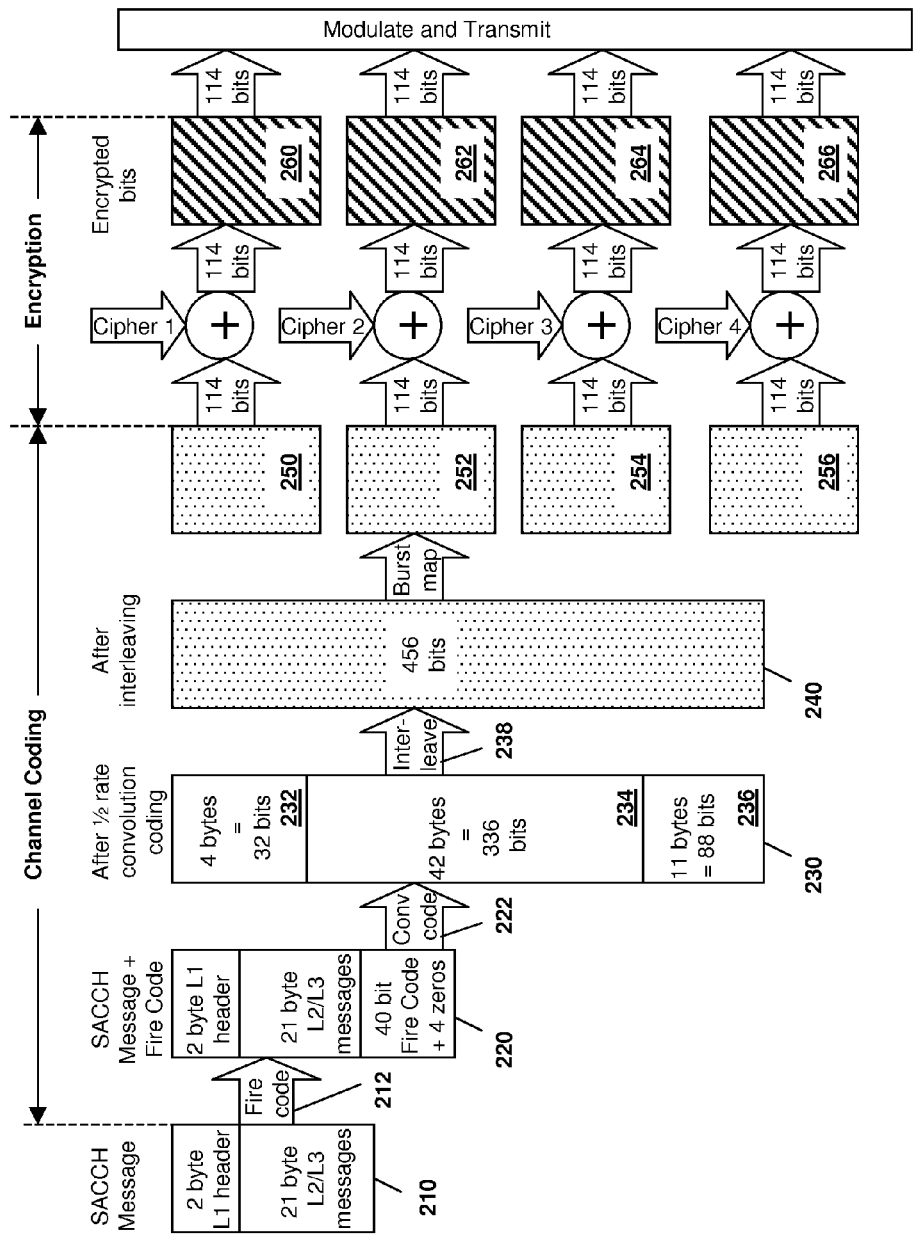
FIG. 2 is a block diagram showing the channel coding and encryption of a SACCH message.

The SACCH message block 100 from FIG. 1 is transformed and encrypted for transmission. Reference is now made to FIG. 2 which shows a block diagram for the transformation, encryption and sending of a SACCH message.

Specifically, in FIG. 2, the original SACCH message 210 is comprised of a 2 byte layer 1 header and a 21 byte layer 2/layer 3 message, as seen above with regard to FIG. 1.

A fire code 212 is applied to SACCH message 210 to produce the message 220. As will be appreciated by those in the art, fire codes are binary cyclic codes designed principally for error detection and a fire code also provides limited error correction capabilities.

Message 220 includes the 2 byte layer 1 header, the 21 byte layer 2/layer 3 message and the 40 bit fire code block followed by a string of 4 zeros which act as the tail bits for convolution encoding. The 40 bits from the fire code are determined by the entire SACCH message content 210.

A convolution code 222 is applied to message 220 to produce message 230. In the embodiment of FIG. 2, convolution code 222 is a half rate convolution code, and is used for error correction.

The half rate convolution coding doubles the size of each of the elements of message 220. Thus, message 230 includes a 4 byte section 232 a 42 byte section 234, and a 11 byte section 236. This SACCH message block after convolution coding thus contains a total of 57 bytes.

An interleaving algorithm 238 is then applied to message 230 to produce message 240. As will be appreciated by those in the art, interleaving changes the order of the bits in message 230 in a predetermined fashion.

The 456 bits of message 240 are then divided into four, 114 bit, segments 250, 252, 254 and 256.

A cipher is then applied to each of bursts 250, 252, 254 and 256 to produce the encrypted bursts 260, 262, 264 and 266, respectively. The cipher applied relates to the encryption key along with a timing block given by the TDMA frame number.

Each of bursts 260, 262, 264, 266 is then modulated and transmitted to the mobile device, with 120 milliseconds between the sending of each burst.

Potential Attacks

Typically an attack is based on the premise that the higher layer information (or part of it) may be known in advance and is transmitted repetitively. As regards to the layer 1 header in SACCH control messages, the contained information is repetitive by nature and seldom changes during the call. In particular, the power control and timing advance are slow varying content and may be known in advance to the attacker if he listens to some call setup messages. Often these values are transmitted by the base station unencrypted over a different channel prior to the establishment of communications with a mobile device. Such unencrypted transmission enables an attacker to launch a successful attack when two identical copies of the SACCH message, or two copies of the SACCH message with at least 64 consecutive known bits, are received. If 64 consecutive bits are known in multiple SACCH messages, the 64 bit key can be derived by using the known plain text attack on these messages.

A further potential attack relates to the repeated SACCH feature, and in particular when the feature is used when downlink SACCH is encrypted. Repeated SACCH mechanisms require that the network repeat the layer 2/layer 3 sub-block 130 contents of the SACCH message in the next frame. The network may also repeat the layer 1 header sub-block. However, since the layer 1 header sub-block 110 is inherently repetitive by nature, the procedure usually results in the total duplication of the SACCH message content on the air interface. The repetition results in a similar problem as highlighted above. In the repetition scenario, the problem is more sever since it is known in advance that the entire SACCH block is going to be repeated in the next SACCH period on the air interface, thus making the job of an attacker easier.

From FIG. 2, the steps to obtain data bursts 250, 252, 254 and 256 are known. In particular, fire code 212, convolution code 222, and interleaving algorithm 238 are standardized and therefore do not provide any security. Thus, if an attacker knows the contents of SACCH message 210, the attacker can replicate these steps to produce bursts 250, 252, 254 and 256. The attacker can then use the known data burst 250, 252, 254 or 256 and the received encrypted burst 260, 262, 264 and 266 to determine the encryption key. Once the encryption key is determined, the encryption key can be used on the voice communications between the mobile device and base station to decrypt the voice communications.

General Problem

In general, the problem is to reduce the possibility that the entire plain text (i.e. message 240 from FIG. 2), of the SACCH block information is known in advance and thus can be used, relatively easily, to determine cipher keys or encryption keys to unlawfully decipher encrypted GSM voice calls, SMS message, among other communications.

Figure 3:
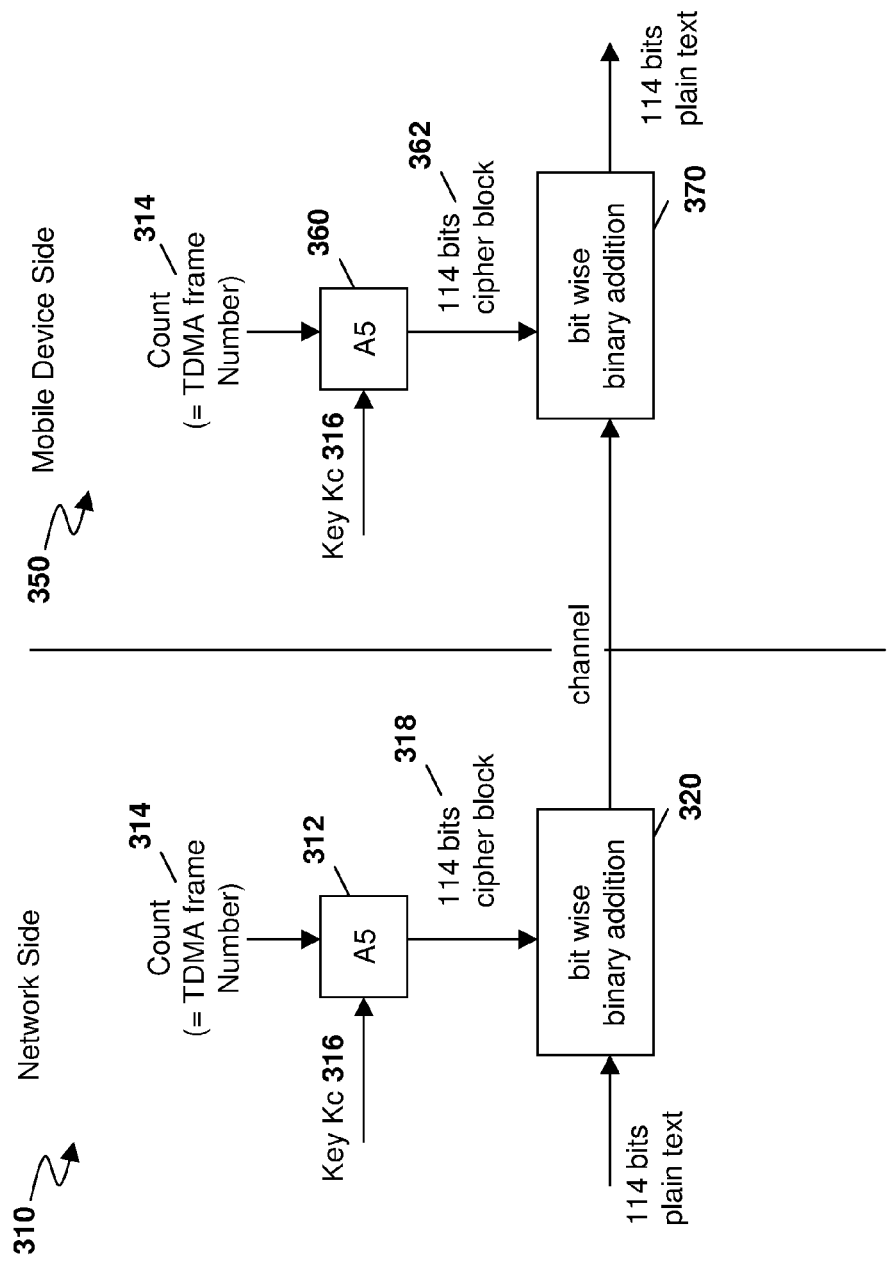
FIG. 3 is a block diagram showing encryption and decryption of a SACCH message using the A5 algorithm.

Reference is now made to FIG. 3, which shows the encryption between the burst 250 and encrypted burst 260 from FIG. 2, and also shows decryption.

In particular, in FIG. 3, network side 310 includes an A5 block 312, which has as inputs a time division multiple access (TDMA) frame number 314 along with an encryption key 316. In case of the A5/1 algorithm, the encryption key is 64 bits long. The output of block 312 is a 114 bit cipher block 318, which is provided to bit wise binary addition block 320.

114 bits of plain text (for example burst 250 from FIG. 2) are then input to block 320. Block 320 does a bit-wise binary addition and produces an output, which may be burst 260 from FIG. 2.

The output from block 320 is then modulated and transmitted over the air and received on mobile device side 350.

Mobile device side 350 also has an A5 block 360, which has, as inputs, the TDMA frame number 314 along with the encryption key 316. Block 360 produces a 114 bit cipher block 362, which forms a first input to bit wise binary addition block 370.

A bit wise binary addition is performed at block 370 with the burst received over the air and the result is 114 plain text bits that should be identical to the burst input to block 320.

Given that the A5/1 algorithm uses 64 bit key for encryption, knowing the entire plain text or preferably 64 consecutive bits in the plain text is known to result in a good chance of successful attack. Typically the attacker relies on the fact that once the L2/L3 message content 210 in FIG. 2 is known, the entire SACCH message and hence all of the plain text is known. The attack can be made significantly complex by randomizing the known bits in the plain text where possible. In particular, 64 consecutive known bits can be avoided either by randomizing the L1 header sub-block 110 or randomizing the layer 2/layer 3 sub-block 130. The attacker typically relies on the fact that the layer 1 header contents rarely change and hence when any given L2/L3 message repeats, it is a good candidate for a plain text attack.

Existing proposals for overcoming the potential vulnerability in the A5/1 encryption include the use of a stronger A5/3 and A5/4 encryption. These encryption standards are already standardized in GSM and may be supported by more recent mobile stations. However, the majority of GSM networks currently use A5/1 and this is likely to remain so for some time in the future, since network operators may need to upgrade hardware to support the stronger encryption.

Other proposals include removing encryption on SACCH control message. However, three problems exist with removing encryption. A first is that legacy mobile devices expect the SACCH message to be encrypted and thus would fail to appropriately receive unencrypted SACCH messages and hence this is not backwards compatible and cannot solve the problems for legacy mobiles in the field. Further, certain short message service (SMS) messages are sent over SACCH during the call and these would need to be encrypted for privacy reasons. If SACCH messages carrying SMS are encrypted then the mobile device would have to blindly determine whether or not each received SACCH block in downlink is actually encrypted or not. This increases the complexity at the mobile station. Further, not encrypting SACCH in downlink may renter the SACCH contents open for a man in the middle sort of attack where a hostile device could broadcast the SACCH messages with contents so as to negatively impact the cell performance.

A further solution is to provide pseudo-randomization or scrambling of certain contents within the layer 2 or layer 3 sub-block 130. With regard to pseudo-randomization, a proposal includes pseudo-randomly cycling through different suitable range formats of neighbor cell descriptions and/or using a variable bit map format with a different origin absolute radio frequency channel number (ARFCN) in successive transmissions, provided that the origin ARFCN is not a real broadcast control channel (BCCH) carrier. However, the number of coding forms to be used for this sort of encoding is limited and likely less than ten, allowing an attacker to simply try all possibilities. Further, a list of neighbor's cells and therefore possible content of the messages could be derived by attackers by getting knowledge of the ARFCNs actually used in the operator's network. Impacts also exist with pseudo-randomization to the mobile device, including the rebuilding of BCCH frequency lists, extra frequency lookup requiring synthesizer tuning, risks of inconsistent neighbor cell rankings and measurement reports at the mobile device side among others.

A further proposal is the scrambling of content in the System Information 6 message. The padding bits in the message may be randomized to produce a different message. However, the alteration of spare padding bits reduces the number of bits that are available for future use and also there is a risk that the padded bits could be decoded for some reason and cause unpredictable behavior on mobile devices. Further, while this reduces the vulnerability of attacks on System Information 6, the overall risk would remain unchanged due to the inherent breaches in System Information 5, 5bis and 5ter described above with regard to pseudo-randomization.

The present methods and systems, conversely, focus on the layer 1 header or convolution codeword.

Layer 1 Header

In a first embodiment, one method to avoid known messages, and hence to prevent successful attacks on A5/1 encoded messages, may be to randomize layer 1 header contents for repeated incidences of system information messages.

As described above with reference to FIG. 1, the layer 1 control header (sub-block 110) comprises two octets and various bits within these two octets may be chosen for randomization in certain situations. One embodiment therefore provides for the selection of a subset of the bits in the layer 1 header for randomization. The selection may be pseudorandom to make it impossible for attacker to know the bits being randomized. Each bit in sub-block 110 is described below with regard to its potential to be set.

With regard to the spare bit 118, the network can set the bit without any system impact to legacy mobile devices. If spare bit 118 is used in the future as a specific control field in relation to a new feature, the bit would then be set appropriately for those mobile stations supporting the feature.

With regard to the SRO bit 116, setting of this bit does not have significant impact to the uplink performance even for post Release 6 mobile devices. The bit causes repetition of uplink SACCH and hence, when the bit is set, it causes repetition of the uplink SACCH. The randomizing of the bit may therefore reduce bandwidth somewhat for the uplink SACCH but improves the performance of uplink SACCH at the same time.

With regard to the FPC EPC bit 114, if EPC is not configured then the bit can be treated as a spare bit and be randomized. On the other hand, if EPC is configured, then the mobile device ignores the normal power control field in the layer 1 header (ordered MS power control 112) of the SACCH. Essentially, in the case of EPC, the entire 5 bit field in the ordered mobile station power level 112 becomes a spare field. In either case there is a spare field in the SACCH layer 1 header that can be randomized by the network.

With regard to the ordered MS power level 112, even if this field is used, changing the content of this field by increasing the ordered power level and then reverting to the actual power level in the next SACCH block, for example, leads to a momentary change in uplink power levels from the mobile station. Randomizing some of these 5 bits result in multiple bits changing in the layer 1 header of the SACCH while having a negligible impact on the system performance. This is especially true if the least significant of the power control bits are set or if power level is only increased momentarily and does not give a detrimental impact on the uplink of the mobile device in question. System interference might increase momentarily when power is increased, but such interference has negligible impact on GSM as it is an orthogonal system.

Further, since the mobile device is not allowed to change its power level other than in steps of nominally 2 dB, strong constraints on the values of the ordered mobile station power levels set by the network would exist as long as the applied power is confined within the expected tolerance. In other words, the network could order the mobile station to vary its power up or down by more than 2 dB (nominal) knowing that the actual instantaneous variation by the mobile device will be limited. Hence the header could include a large power increase to increase the possible randomization of the header sub-block 110, but the actual power increase will be limited to a 2 dB step.

The $2^{nd}$ octet in the layer 1 header is the order timing advance 120. The changing of the order timing advance 120 field might be acceptable to some degree. As will be appreciated by those in the art having regard to the present disclosure, a wrong timing advance in uplink might lead to failure of synchronization in the uplink depending on the network implementation. Thus the field should only be varied within constraints. Commanding timing advance values close to but different from the estimated delay compensation value could be considered an option depending on network performance and implementation in terms of delay tracking.

The selection of bits to randomize can be performed for each burst being sent. The selection can vary and patterns should, in one embodiment, be avoided to reduce the possibility of successful attack.

It should be noted that the 40 bits of the fire code (see message 220 in FIG. 2) are the function of the entire SACCH message block (message 210 in FIG. 2). Hence, changing even a single bit in the layer 1 header of the SACCH would change multiple bits in these 40 fire code bits. Hence, a number of bits of encoded SACCH will be unknown to the attacker.

Figure 4:
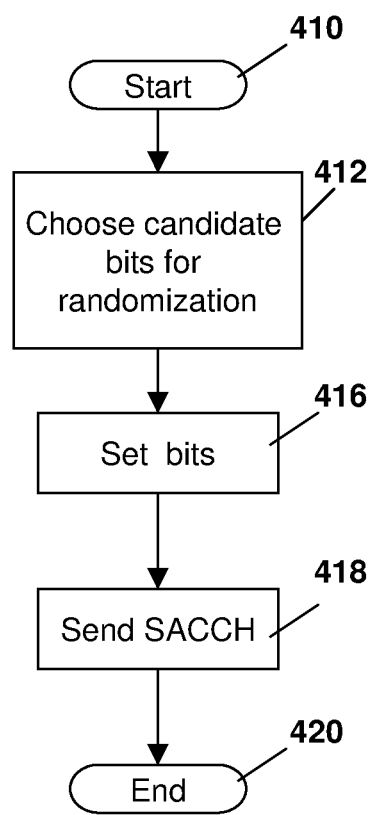
FIG. 4 is a process diagram showing a process for randomizing bits in a layer 1 header of a SACCH message.

Reference is now made to FIG. 4, which shows a process diagram for one embodiment of present disclosure. The process of FIG. 4 starts at block 410 and proceeds to block 412 in which candidate bits are chosen for randomization.

A combination of candidate bits from the various fields in the layer 1 SACCH header and their settings could be randomly or pseudo-randomly chosen by a network element from one message to the next. The choice may further depend on channel conditions. This ensures that SACCH frames containing the same system information message are differing because of changes in the layer 1 header.

Further, if the contents of the layer 1 header are naturally different because of link control purposes, no additional modifications are typically needed by the network and thus the results of block 412 may be to choose no bits at all.

The process then proceeds to block 416 in which the selected bits are set. After setting, the processing shown in FIG. 2, including convolution coding and interleaving prior to encryption, are generally performed The process then proceeds to block 418 and sends the SACCH message.

The process then proceeds to block 420 and ends.

Based on FIG. 4, the layer 1 header is randomized by randomly setting one or more of the layer 1 header fields listed above during the call, where the bits randomized may differ between messages. An attacker would not be able to reliably know the contents of the plain text in the interleaved SACCH message during the call due to the changing layer 1 header. Thus, even if the first SAACH blocks and the L1 header are transmitted in clear text in the early stages of the call before a ciphering mode complete message has been received, the attacker would not know subsequent layer 1 header information which may preclude the attack on the encryption for that call.

In operation, in one SACCH system information message, the selection at block 412 may for example choose the spare bit, the FPC/EPC bit and slightly change the ordered timing advance. In a subsequent frame, the system information message may have a header that is modified such that the SRO bit is set and the ordered power level is increased slightly.

The above provides a solution that is backwards compatible for mobile devices. Further, there is no need to standardize such randomization of the layer 1 header and each network operator may implement the solution in its own way, further causing problems for a potential attacker. Different vendors may implement the randomization in a different way, rendering standard attack procedures less likely to succeed.

Forward Error Correction Coding

In an alternative embodiment, the message bits can be toggled after forward error correction coding. In case of the SACCH, the forward error correction coding is implemented by the convolution coding. Thus, the convolutional coded bits may be toggled after encoding. In general this method of toggling the bits after forward error correction coding of any message that is eventually encrypted could increase the robustness of these messages for known plain text attacks. For SACCH, as indicated with regards to FIG. 2, a convolution code 222 is applied to the 228 bit message 220. In case of SACCH the purpose of the convolution code (as is the purpose of any forward error correcting code in general) is to correct any naturally occurring errors incurred during transmission over the wireless channel from the base station to the mobile.

In order to provide randomization, a sufficiently low density of errors may be inserted into the constructed convolution code before transmission. Such insertion would provide sufficient variability to each SACCH transmission block such that no two transmissions of the same block contain exactly the same sequence of 64 consecutive bits before ciphering. Furthermore, since the added errors are of low density, minimal impact is made on the overall error correction performance of the convolution code at the receiver. The added "artificial" error rate may be tuned depending on the estimated "natural" error rate, so that the impact on the link quality for the actual mobile device receiving the call remain acceptable and the errors can be corrected.

Thus, in poor network conditions, the artificial error rate may be very low whereas in good network conditions, more errors may be introduced. Also, in the case of repeated SACCH, more errors could be introduced for repeated instances of the SACCH and these errors could be complimentary to the errors introduced in the previous SACCH block.

Figure 5:
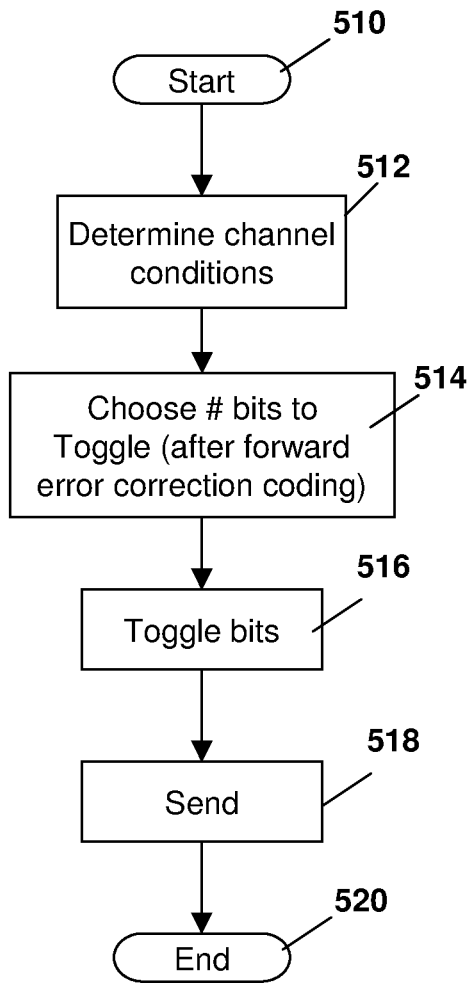
FIG. 5 is a process diagram showing the process of toggling bits after convolution coding of a SACCH message.

Reference is now made to FIG. 5. The process of FIG. 5 starts at block 510 and proceeds to block 512 in which channel conditions are determined for the actual mobile station receiving the call. Determination of channel conditions is known to those in the art and, in some embodiments, can include the reception by a network element of channel quality measurement reports from the mobile station in question.

The process then proceeds to block 514 in which the number of bits to toggle after forward error correction coding (which in case of SACCH is the convolutional code) is chosen. In one embodiment, the number of bits is chosen based, in part, on the channel conditions determined at block 512. Thus, if poor channel conditions exist, the number of bits chosen may be low, while in good channel conditions a larger number of bits may be chosen.

The process then proceeds to block 516 in which the chosen bits are toggled after the forward error correction (convolution) encoding. Such toggled bits would, in one embodiment, be introduced based on the chosen number of bits at block 514. The errors would typically be randomly/pseudo randomly inserted to prevent reception of encrypted messages without errors over the air by an attacker.

The process then proceeds to block 518 and the message is sent. The message sent at block 518 has had the interleaving completed and the encryption completed prior to being sent.

The process then proceeds to block 520 and ends.

The toggling of bits after convolution coding is done to ensure that there are no 64 known consecutive bits being sent, making it difficult for an attacker to perform a "known plain text" attack on the A5/1 encoded message. The ability to randomly create and insert such errors further enhances the security of the message by making it difficult or impossible for an attacker to predict the actual bits that are toggled.

The above therefore provides for the choosing for randomization and setting of bits in the layer 1 header of a SACCH message block or the introduction of a low level of randomized bits after convolution coding to prevent known plain text attacks on the SACCH message. The two techniques can be performed independently or used in conjunction with each other. The use of the solutions is compatible with legacy mobile devices already deployed and does not add to hardware costs for network operators.

Figure 6:
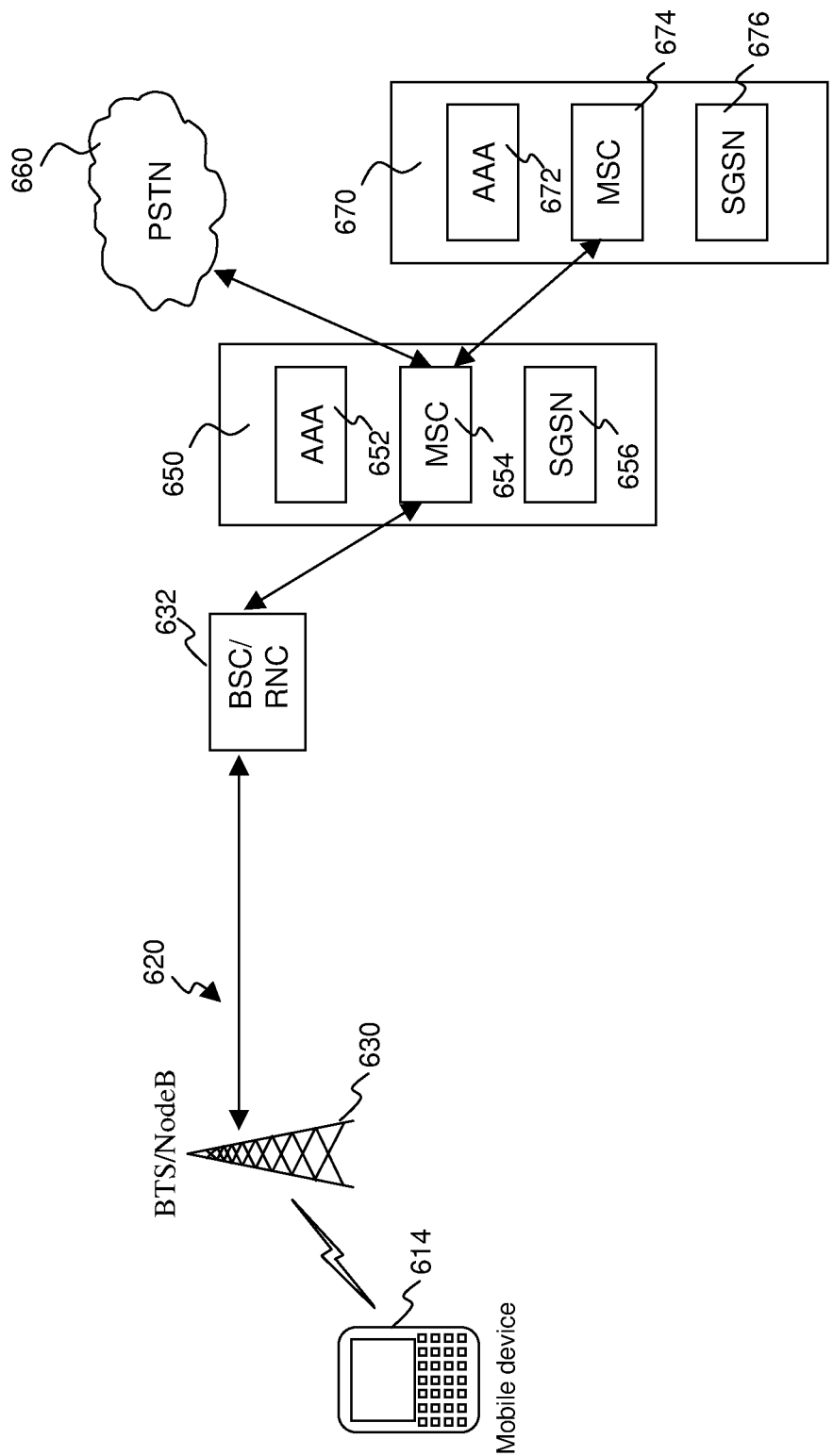
FIG. 6 is a block diagram showing an exemplary network architecture.
Figure 7:
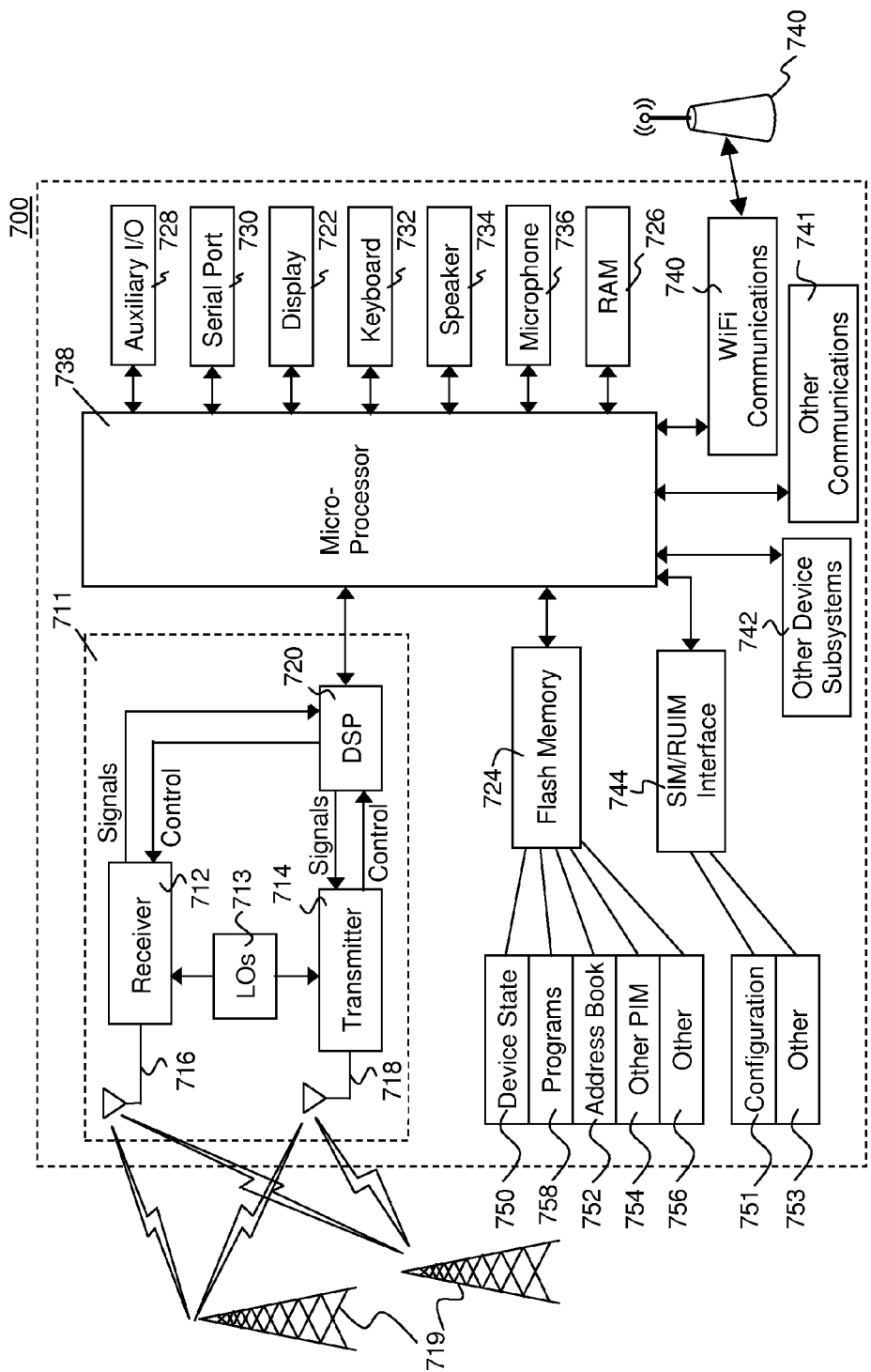
FIG. 7 is a block diagram of an exemplary mobile device.

The methods of FIGS. 4 and 5, along with the coding and encryption of FIGS. 2 and 3, can be performed by any network element. As used herein, a network element can be a network side server or a mobile device. Reference is now made to FIGS. 6 and 7, which show exemplary network and mobile device architectures.

FIG. 6 illustrates an architectural overview for an exemplary network. A mobile device 614 is configured to communicate with cellular network 620.

Mobile device 614 may connect through cellular network 620 to provide either voice or data services. As will be appreciated, various cellular networks exist, including, but not limited to, global system for mobile communication (GSM), general packet radio service (GPRS), code division multiple access (CDMA), universal mobile telecommunications system (UMTS), and wideband code division multiple access (WCDMA), among others. These technologies allow the use of voice, data or both at one time.

Cellular network 620 comprises a base transceiver station (BTS)/Node B 630 which communicates with a base station controller (BSC)/Radio Network Controller (RNC) 632. BSC/RNC 632 can access the mobile core network 650 through either the mobile switching center (MSC) 654 or the serving GPRS switching node (SGSN) 656. MSC 654 is utilized for circuit switched calls and SGSN 656 is utilized for data packet transfer. As will be appreciated, these elements are GSM/UMTS specific, but similar elements exist in other types of cellular networks.

Core network 650 further includes an authentication, authorization and accounting module 652 and can further include items such as a home location registry (HLR) or visitor location registry (VLR).

MSC 654 connects to a public switched telephone network (PSTN) 660 for circuit switched calls. Alternatively, for mobile-to-mobile calls the MSC 654 may connect to an MSC 674 of core network 670. Core network 670 similarly has an authentication, authorization and accounting module 672 and SGSN 676. MSC 674 could connect to a second mobile device through a base station controller/node B or an access point (not shown). In a further alternative embodiment, MSC 654 may be the MSC for both mobile devices on a mobile-to-mobile call.

In accordance with the present disclosure, any network element, including mobile device 614, BTS 630, BSC 632, MSC 652, and SGSN 656 could be used to perform the methods of FIGS. 4 and 5. In general, such network element will include a communications subsystem to communicate with other network elements, a processor and memory which interact and cooperate to perform the functionality of the network element.

Further, if the network element is a mobile device, any mobile device may be used. One exemplary mobile device is described below with reference to FIG. 7. The use of the mobile device of FIG. 7 is not meant to be limiting, but is provided for illustrative purposes.

Mobile device 700 is a two-way wireless communication device having at least voice communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 700 is enabled for two-way communication, it can incorporate a communication subsystem 711, including both a receiver 712 and a transmitter 714, as well as associated components such as one or more, antenna elements 716 and 718, local oscillators (LOs) 713, and a processing module such as a digital signal processor (DSP) 720 The particular design of the communication subsystem 711 depends upon the communication network in which the device is intended to operate.

When required network registration or activation procedures have been completed, mobile device 700 may send and receive communication signals over the network 719. As illustrated in FIG. 7, network 719 can comprise of multiple base stations communicating with the mobile device.

Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. ND conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Network access requirements will also vary depending upon the type of network 719. In some networks network access is associated with a subscriber or user of mobile device 700. A mobile device may require a removable user identity module (RUIM) or a subscriber identity module (SIM) card in order to operate on a network. The SIM/RUIM interface 744 is normally similar to a card-slot into which a SIM/RUIM card can be inserted and ejected. The SIM/RUIM card hold many key configurations 751, and other information 753 such as identification, and subscriber related information.

Mobile device 700 includes a processor 738 which controls the overall operation of the device. Communication functions, including at least data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 can be stored in a persistent store such as flash memory 724, which may instead be a read-only memory (ROM) or similar storage element (not shown). Specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate each program can allocate a portion of flash memory 724 for their own data storage requirements. Processor 738, in addition to its operating system functions, can enable execution of software applications on the mobile device. A predetermined set of applications which control basic operations, including at least data and voice communication applications for example, will normally be installed on mobile device 700 during manufacturing. Other applications could be installed subsequently or dynamically.

A software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application can have the ability to send and receive data items, via the wireless network 719. In an embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or a non-volatile store (not shown) for execution by the microprocessor 738. Such flexibility in application installation increases the functionality of the device and may provide enhanced on-device functions, communication-related functions, or both.

In a data communication mode, a received signal such as a text message or web page download will be processed by the communication subsystem 711 and input to the microprocessor 738, which further processes the received signal for element attributes for output to the display 722, or alternatively to an auxiliary I/O device 728.

A user of mobile device 700 may also compose data items such as email messages for example, using the keyboard 732, which can be a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile device 700 is similar, except that received signals would be output to a speaker 734 and signals for transmission would be generated by a microphone 736. Alternative voice or audio I/O subsystems, such as a voice message recording subsystem, may also be implemented on mobile device 700. Although voice or audio signal output is accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. Serial port 730 can further be used to connect the mobile device to a computer to act as a modem.

WiFi Communications Subsystem 740 is used for WiFi Communications and can provide for communication with access point 743.

Other communications subsystem(s) 741, such as a short-range communications subsystem, are further components that may provide for communication between mobile device 700 and different systems or devices, which need not necessarily be similar devices. For example, the subsystem(s) 741 may include an infrared device and associated circuits and components or a Bluetooth™ communication module to provide for communication with similarly enabled systems and devices.

The embodiments described herein are examples of structures, systems or methods having elements corresponding to elements of the techniques of the present application. The above written description may enable those skilled in the art to make and use embodiments having alternative elements that likewise correspond to the elements of the techniques of the present application. The intended scope of the techniques of the above application thus includes other structures, systems or methods that do not differ from the techniques of the present application as described herein, and further includes other structures, systems or methods with insubstantial differences from the techniques of the present application as described herein.

The invention claimed is:

1. A method comprising:
   selecting, by a hardware processor of a wireless transmission device, a field in a layer 1 header of a slow associated control channel ('SACCH') message associated with a channel, for randomization, wherein the selecting is performed based on a channel condition of the channel or capabilities of a receiver;
   setting, by the hardware processor of the wireless transmission device, one or more bits in the selected field in the SACCH message to a random value, wherein the one or more bits in the selected field are at least one of a spare bit, a SACCH repeat order ('SRO') bit, a fast power control ('FPC') or enhanced power control ('EPC') mechanism signaling bit, one or more bits from an order mobile station power level field, or one or more bits from an ordered timing advance field;
   performing, by the hardware processor of the wireless transmission device, channel coding and encryption of said SACCH message, wherein said SACCH message includes the one or more bits in the selected field set to the random value; and
   transmitting the SACCH message from the wireless transmission device to the receiver.

2. The method of claim 1, wherein the one or more bits from the ordered mobile station power level field are selected to vary a transmit power.

3. The method of claim 1, wherein the one or more bits from the ordered timing advance field are selected to vary timing.

4. The method of claim 1, wherein any of the one or more bits from the ordered mobile station power level field are used if enhanced power control is enabled.

5. The method of claim 1, wherein the field is selected pseudorandomly for each message.

6. The method of claim 1, wherein the field is selected to avoid a predetermined consecutive number of bits of the encrypted slow associated control channel message being the same.

7. The method of claim 6, wherein the predetermined consecutive number of bits are greater than or equal to a length of a key used in a encryption algorithm for generation of a cipher text.

8. The method of claim 1, wherein said encryption is A5/1 encryption in a Global System for Mobile Communications system.

9. The method of claim 1, wherein the channel coding comprises a fire code, convolution code algorithm, interleaving algorithm and a burst mapping after said setting but before said encryption.

10. The method of claim 1, wherein the wireless transmission device is at least one of a mobile device or a Global System for Mobile Communications network node.

11. A wireless transmission device, comprising:
    a memory; and
    at least one hardware processor communicatively coupled with the memory and configured to:
      select, by the at least one hardware processor, a field in a layer 1 header of a slow associated control channel ('SACCH') message associated with a channel, for randomization, wherein the selection of the field is based on a channel condition of the channel or capabilities of a receiver;
      set, by the at least one hardware processor, one or more bits in the selected field in the SACCH message to a random value, wherein the one or more bits in the selected field are at least one of a spare bit, a SACCH repeat order ('SRO') bit, a fast power control ('FPC') or enhanced power control ('EPC') mechanism signaling bit, one or more bits from an order mobile station power level field, or one or more bits from an ordered timing advance field;
      perform, by the at least one hardware processor, channel coding and encryption of said SACCH message, wherein said SACCH message includes the one or more bits in the selected field set to the random value; and
      transmit the SACCH message from the wireless transmission device to the receiver.

12. The wireless transmission device of 11, wherein the wireless transmission device is at least one of a mobile device or a Global System for Mobile Communication network node.

13. The wireless transmission device of claim 11, wherein the one or more bits from the ordered mobile station power level field are selected to vary a transmit power.

14. The wireless transmission device of claim 11, wherein the one or more bits from the ordered timing advance field are selected to vary timing.

15. The wireless transmission device of claim 11, wherein the wireless transmission device is at least one of a mobile device or a Global System for Mobile Communications network node.

16. The wireless transmission device of claim 11, wherein the field is selected to avoid a predetermined consecutive number of bits of the encrypted slow associated control channel message being the same.

* * * * *